(No Model.)
W. W. BYINGTON.
FISH LINE AND HOOK GUARD.
No. 309,028. Patented Dec. 9, 1884.
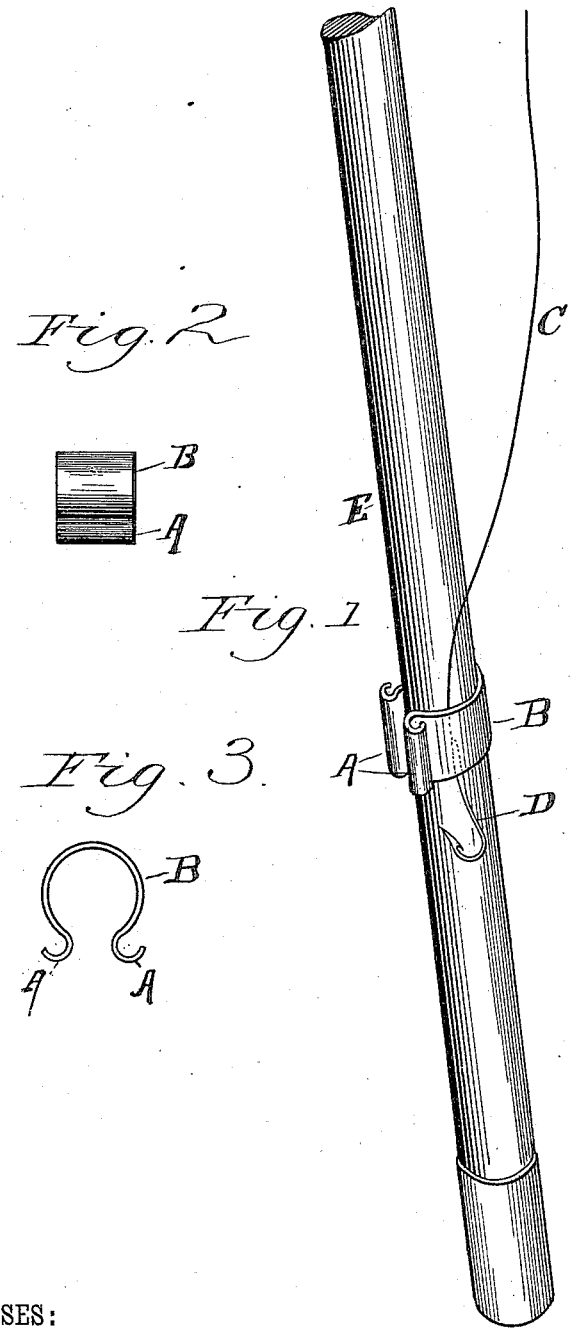
WITNESSES:
INVENTOR

UNITED STATES PATENT OFFICE.

WILLIAM W. BYINGTON, OF ALBANY, NEW YORK.

FISH LINE AND HOOK GUARD.

SPECIFICATION forming part of Letters Patent No. 309,028, dated December 9, 1884.

Application filed May 8, 1884. (No model.)

*To all whom it may concern:*

Be it known that I, WILLIAM W. BYINGTON, a citizen of the United States, residing in the city and county of Albany and State of New York, have invented a new and useful Improvement in Fish Line and Hook Guards; and I hereby declare that the following is a full, clear, and exact description of the same.

My invention relates to a guard or holder of novel construction for the fish-line or the fish-hook when said hook and said line are attached to or strung upon the fish-rod, and not in use; and its object is to hold the said hook or the line flat and close to the said fish-rod and prevent its becoming detached or swinging loose and the hook or the line catching in the clothes of the person carrying it, or in trees, bushes, or other neighboring objects.

My said invention consists of a piece of elastic metal constructed in a circular shape, with open ends, somewhat resembling the ordinary "eye" of the "hook and eye" of commerce, and so constructed that the open ends will spring apart and slip over the fish-rod and the shaft or shank of the fish-hook, or over said fish-hook, or over said fish-rod and the fish-line at any desirable point, and said open ends spring back in place and hold the said fish-hook or the line, as the case may be, flat and close to the said fish-rod and prevent them from being detached or slipping away from said fish-rod.

In the accompanying drawings, Figure 1 is a perspective view of my said invention, showing the application of the said guard to said fish rod or pole and said hook or line. Fig. 2 is a side view of my said invention detached from the fish-rod. Fig. 3 is an end view of the invention detached from the fish-rod.

Similar letters in said figures denote similar parts.

A A are the ends of the said fish line and hook guard, which spring open and permit said fish-rod and the fish-line or said fish-rod and the hook to enter between them. The reason why these ends are turned outward and curling is so as to enable them to be more easily separated to slip over said rod and line or hook and to prevent scratching the varnish upon the pole or rod. B is the circular portion of the said guard, which fits over the rod and acts as a spring to bring the ends A A together, and clasps the fish hook or line and holds them snug, close, and flat to said fish-rod. C is the fish-line, and D the fish-hook, held firmly and close to said pole by said guard, and E is said fish-rod.

In using my said invention I separate the ends of the guard and spring it over the fish rod and line or hook at any desirable point, and when the guard is in position on the pole it holds the fish-line or fish-hook firmly, close, and flat upon the said rod, preventing them or either of them from swinging loose and said hook from catching into any neighboring object.

What I claim as my invention, and desire to secure by Letters Patent, is—

The combination, with a fishing-rod and the line dependent from one end thereof, of a detachable spring-band encircling the rod and clamping the line between the inner surface of the band and the outer surface of the rod, whereby during transportation the rod and line are maintained in close relationship with each other throughout their length, while the line may be readily and speedily released for use, substantially as described.

WILLIAM W. BYINGTON.

Witnesses:
JULIUS F. HARRIS,
GEORGE W. FEATHERSTONHAUGH.